Dec. 6, 1966     E. C. SLOAN ET AL     3,289,512
APPARATUS FOR SEPARATING SPACED PACKAGES FROM A
CONTINUOUS MOVING FILM OF PACKAGING MATERIAL
Original Filed May 29, 1962     12 Sheets-Sheet 1
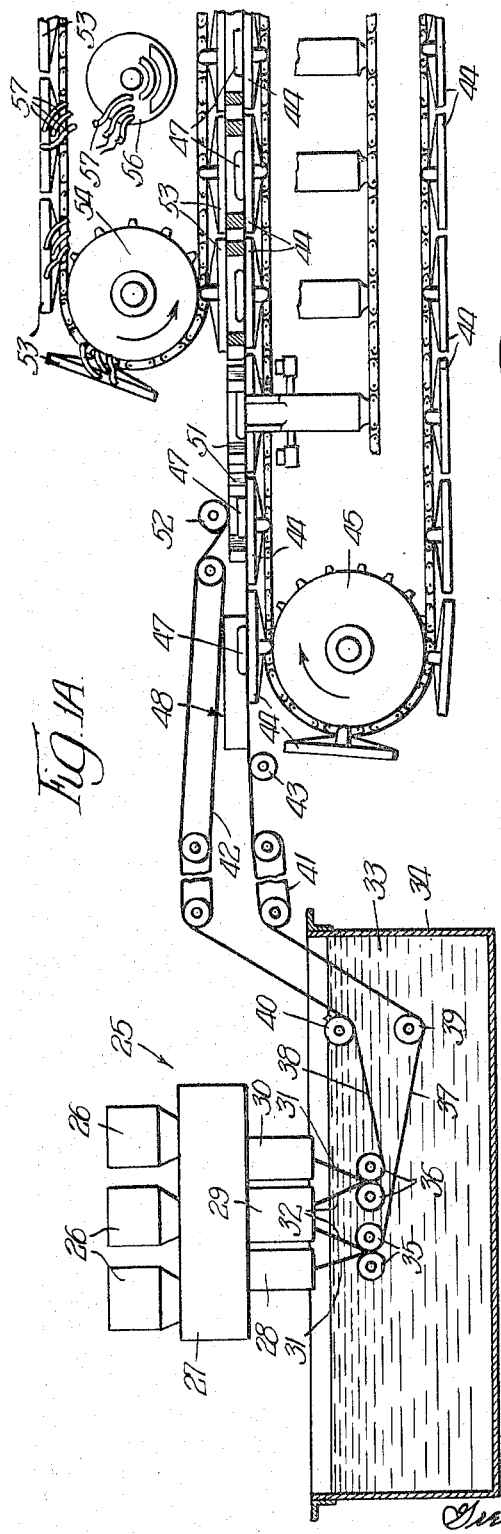
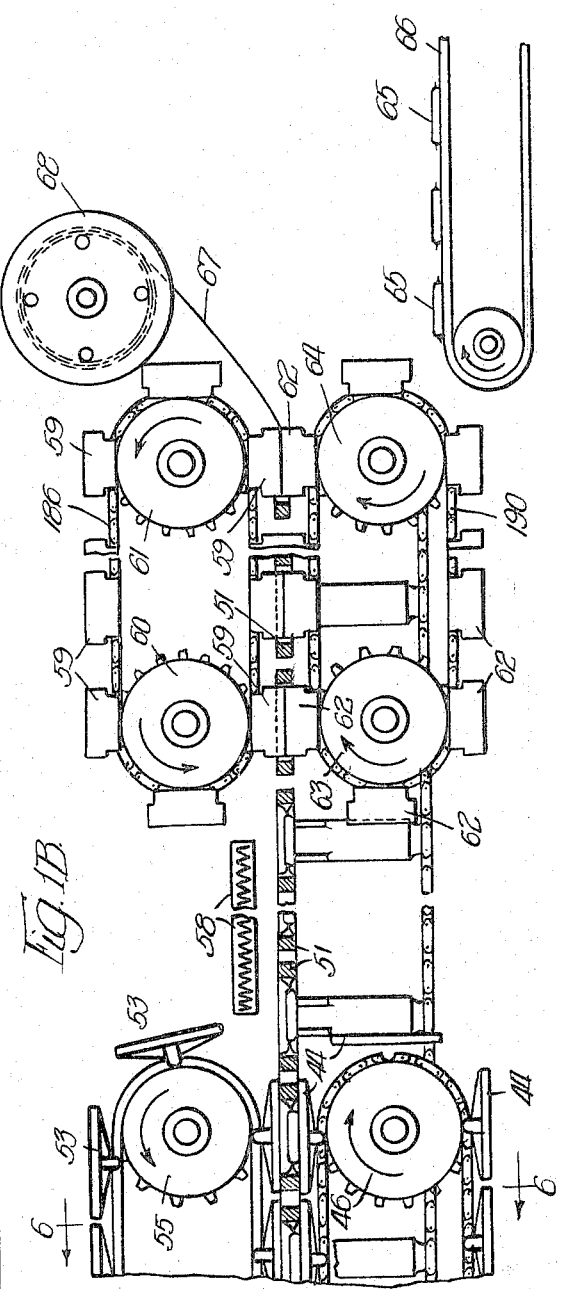
INVENTORS.
Edward C. Sloan,
Augustus H. Eberman,
Hans A. Jensen.

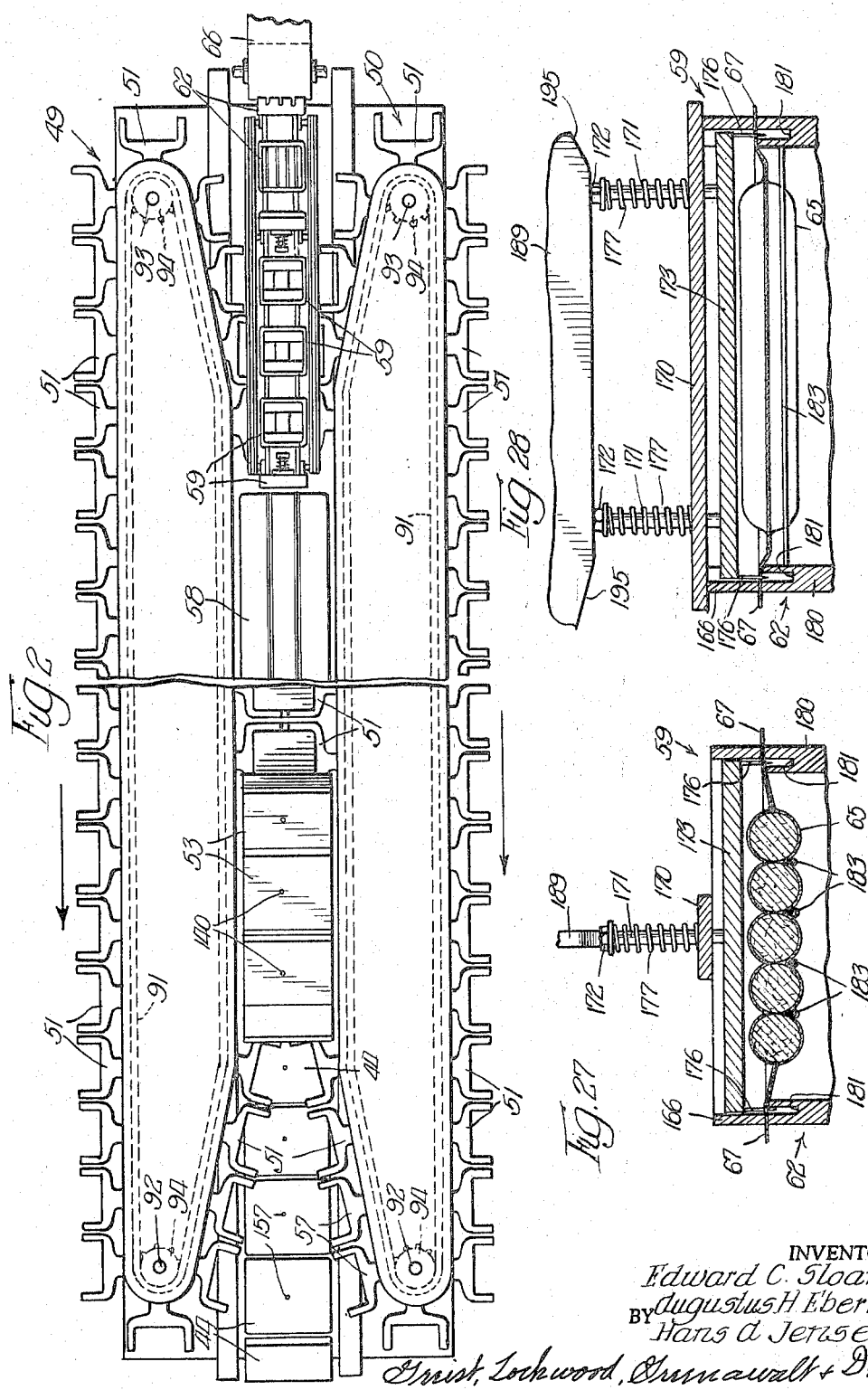

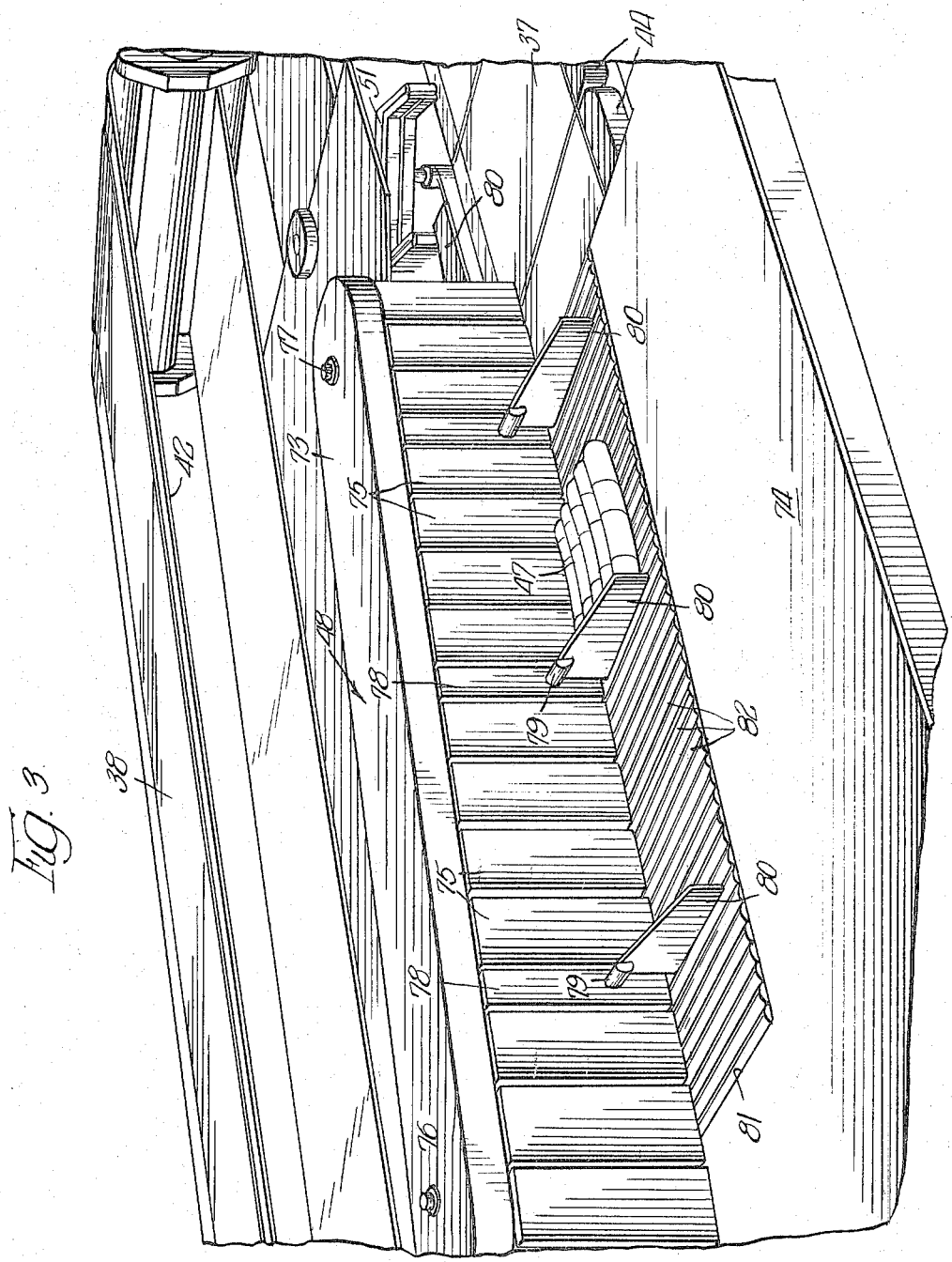

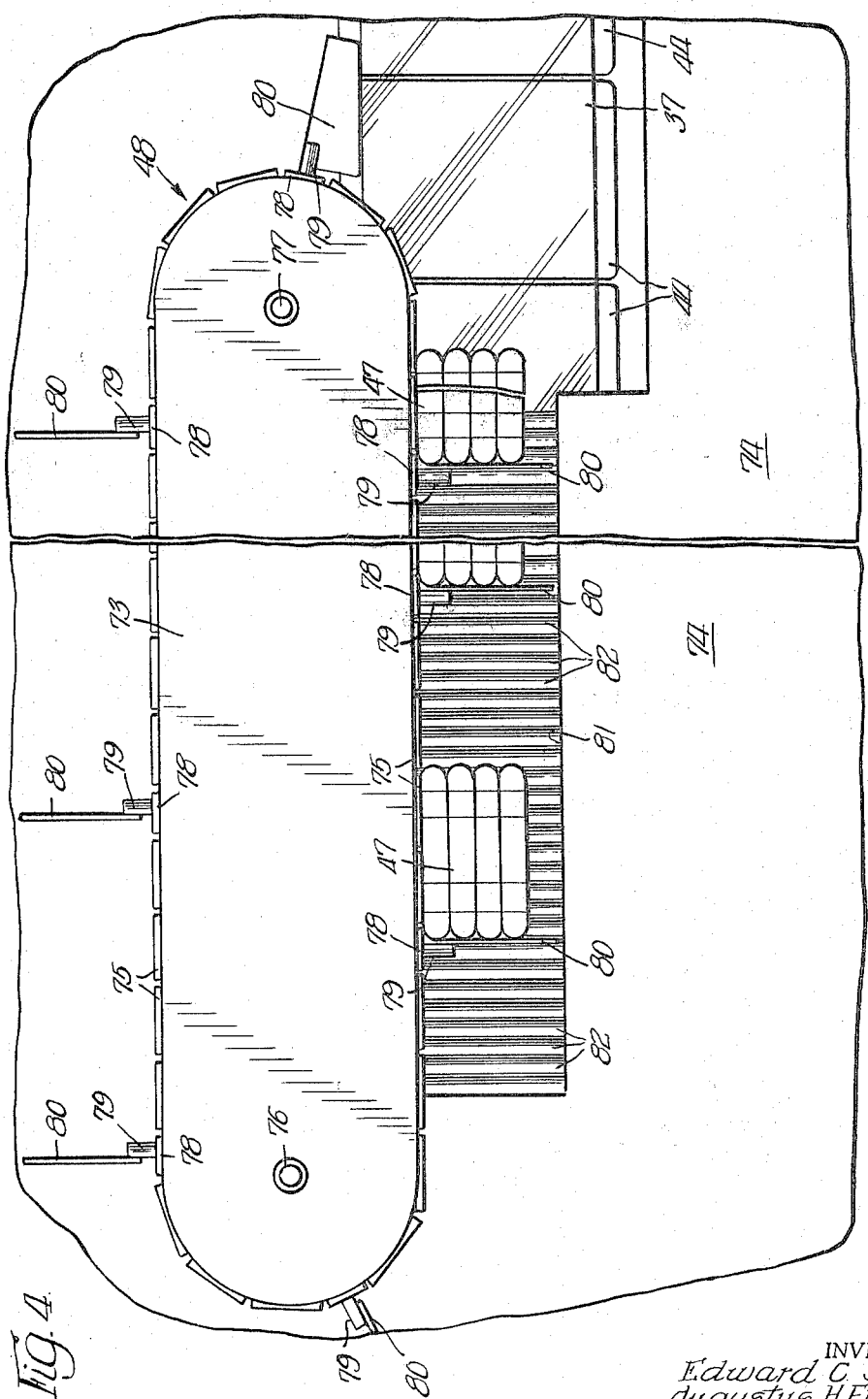

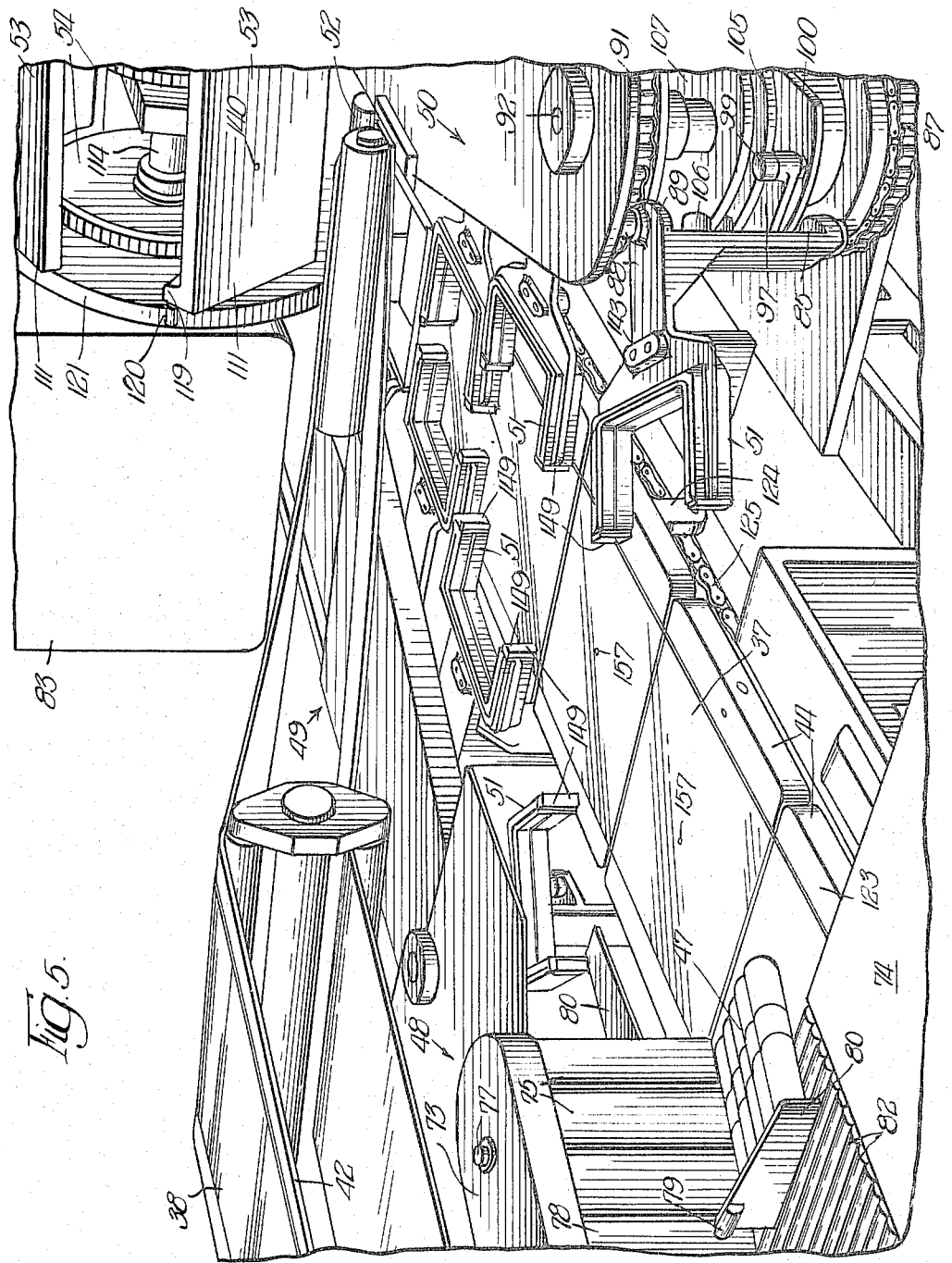

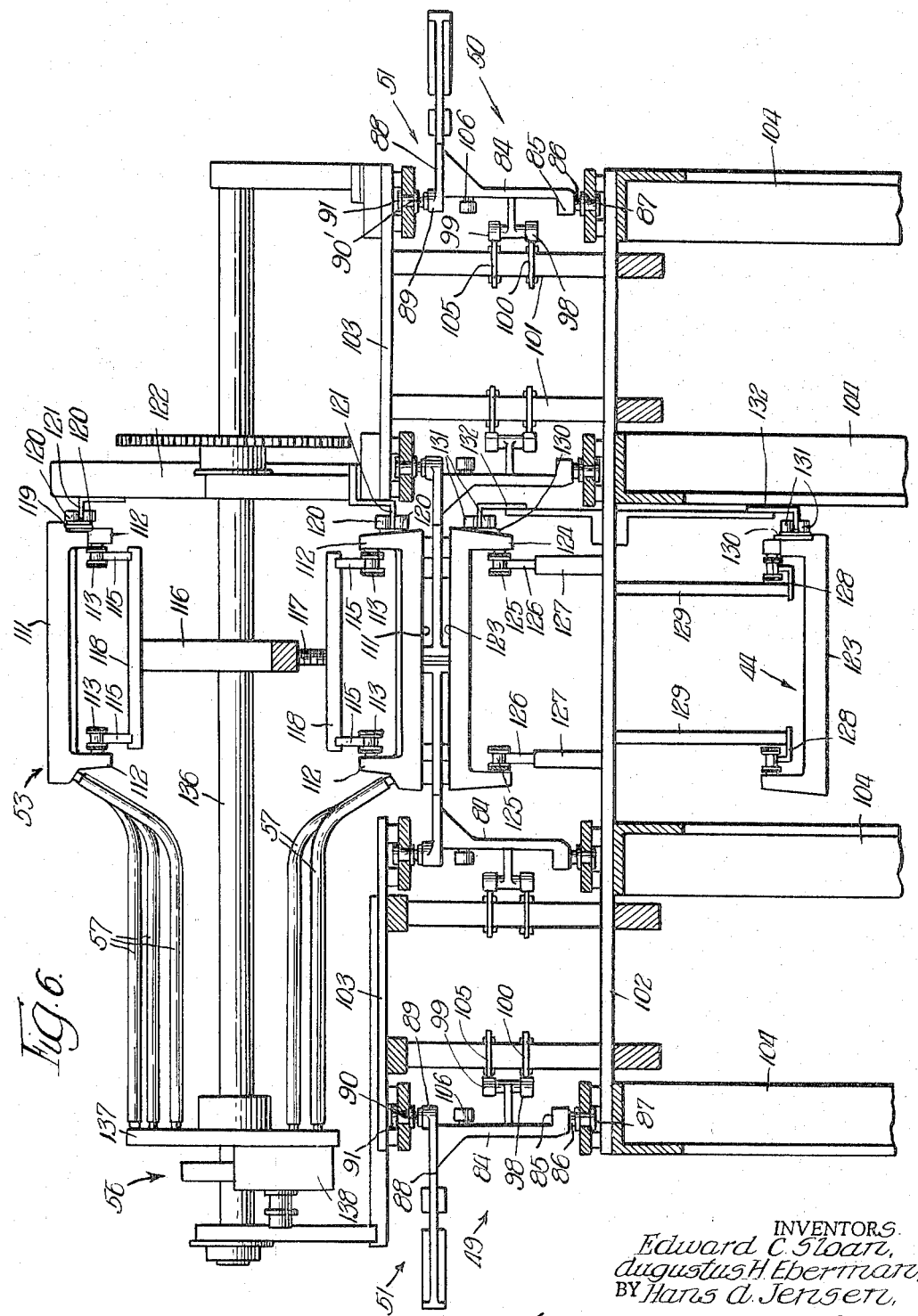

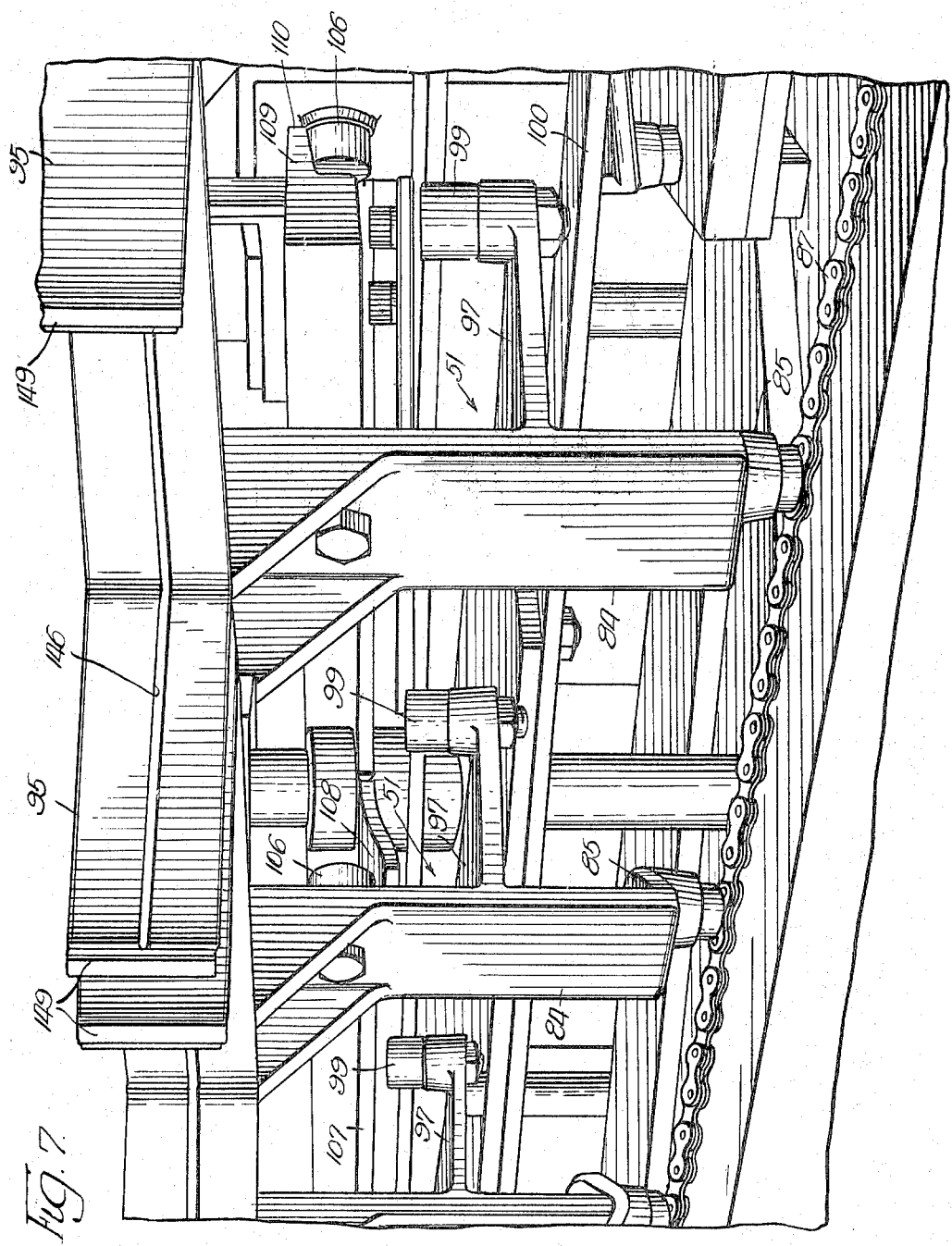

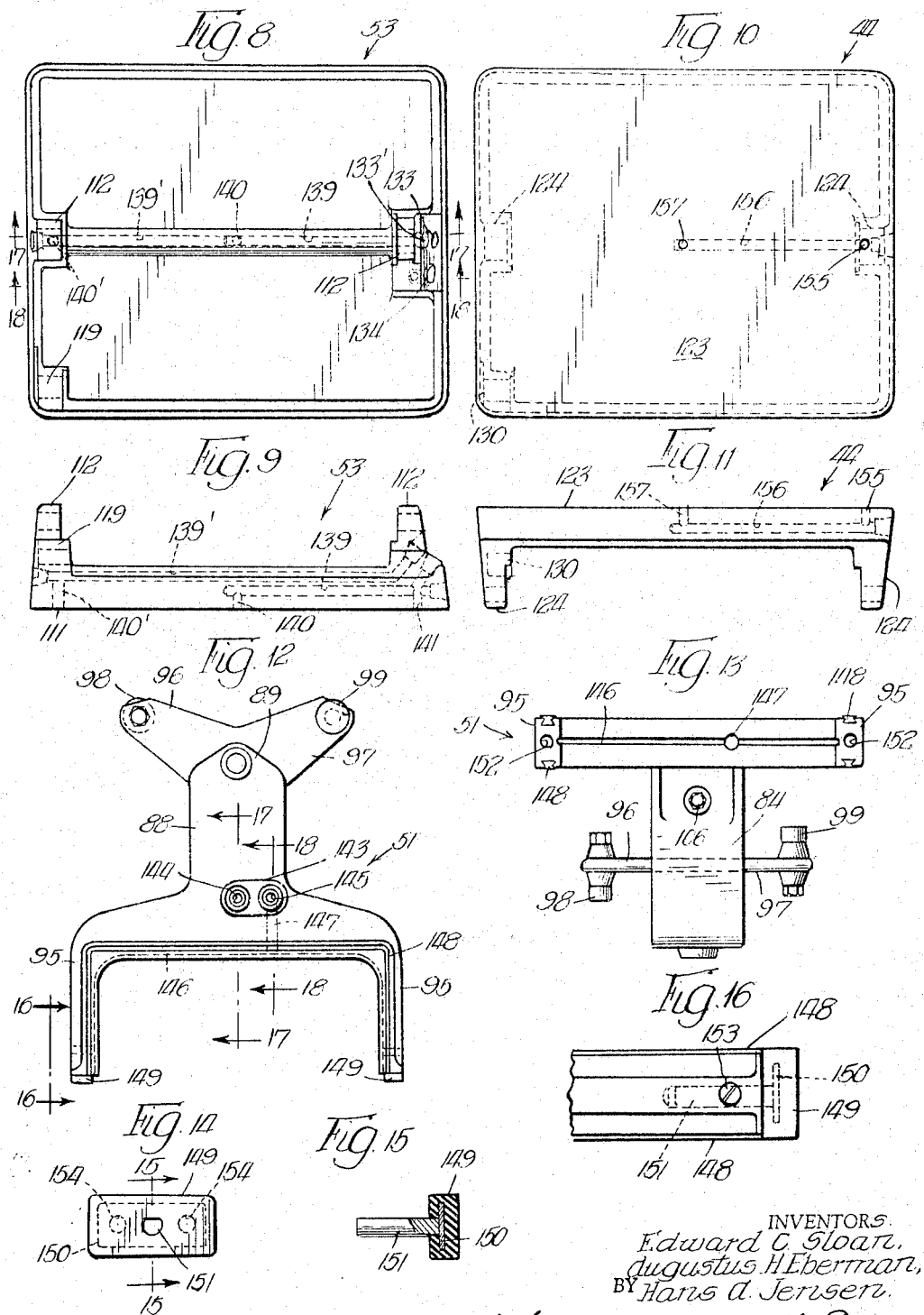

Dec. 6, 1966
E. C. SLOAN ET AL 3,289,512
APPARATUS FOR SEPARATING SPACED PACKAGES FROM A
CONTINUOUS MOVING FILM OF PACKAGING MATERIAL
Original Filed May 29, 1962 12 Sheets-Sheet 9
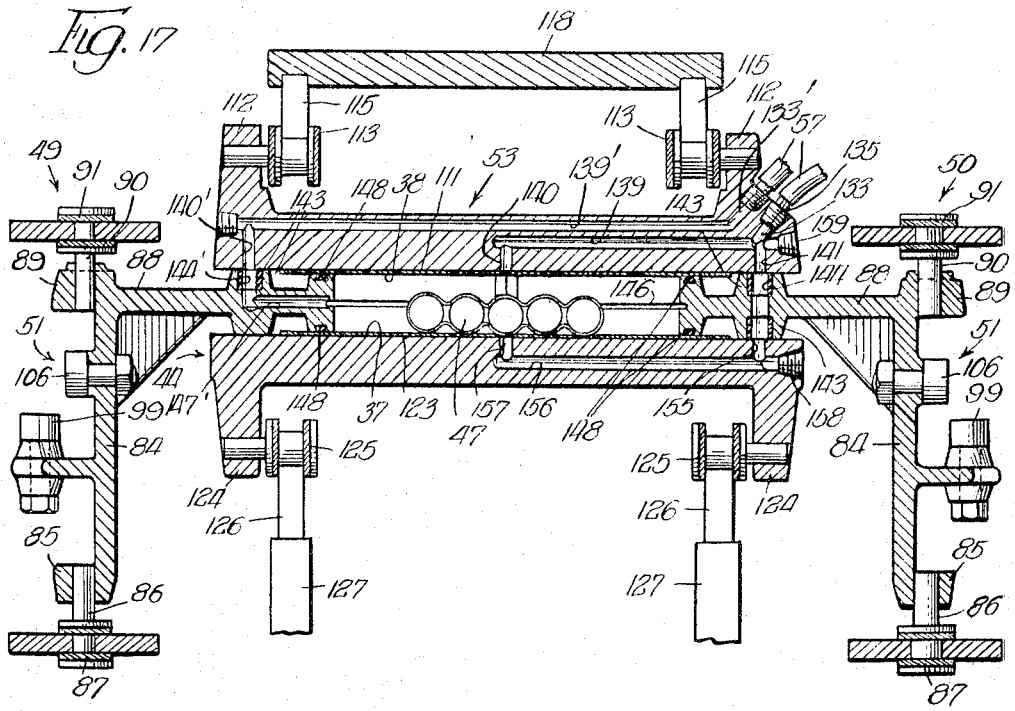
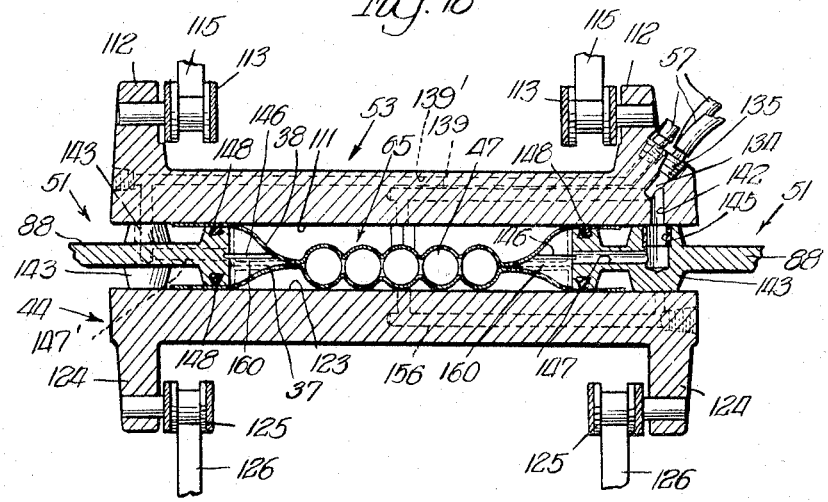
INVENTORS.
Edward C. Sloan,
Augustus H. Eberman,
BY Hans A. Jensen.

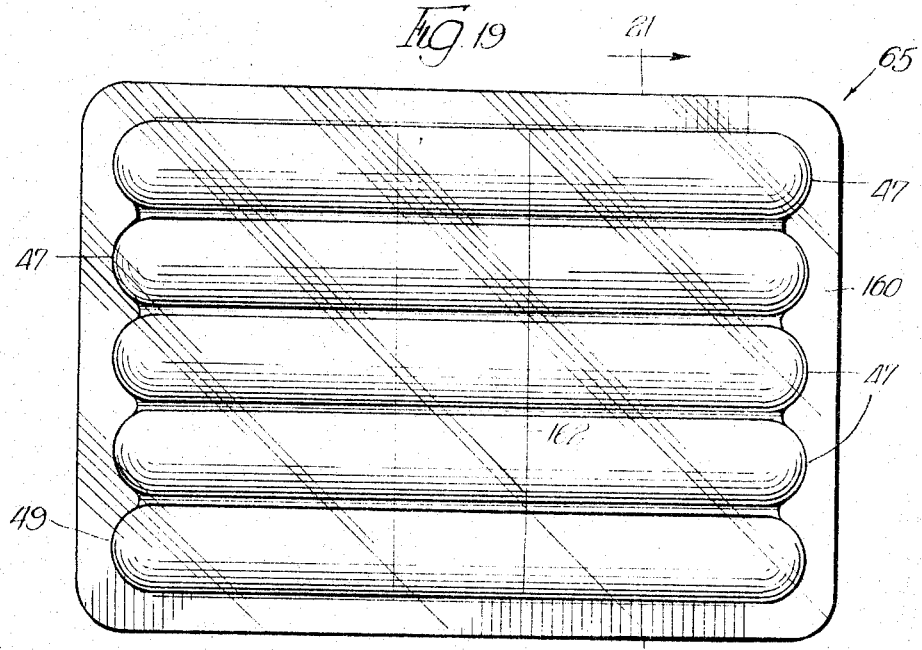
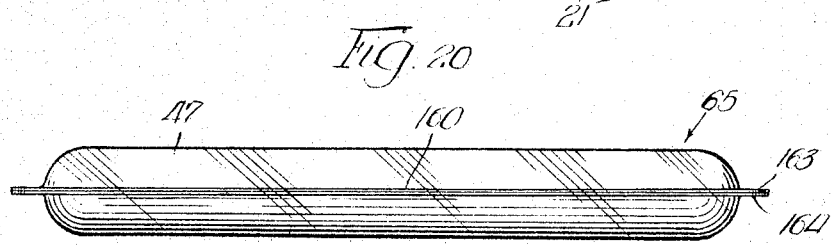
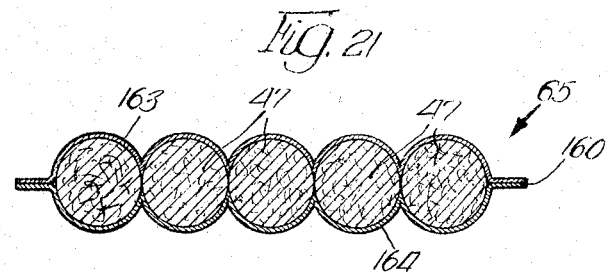

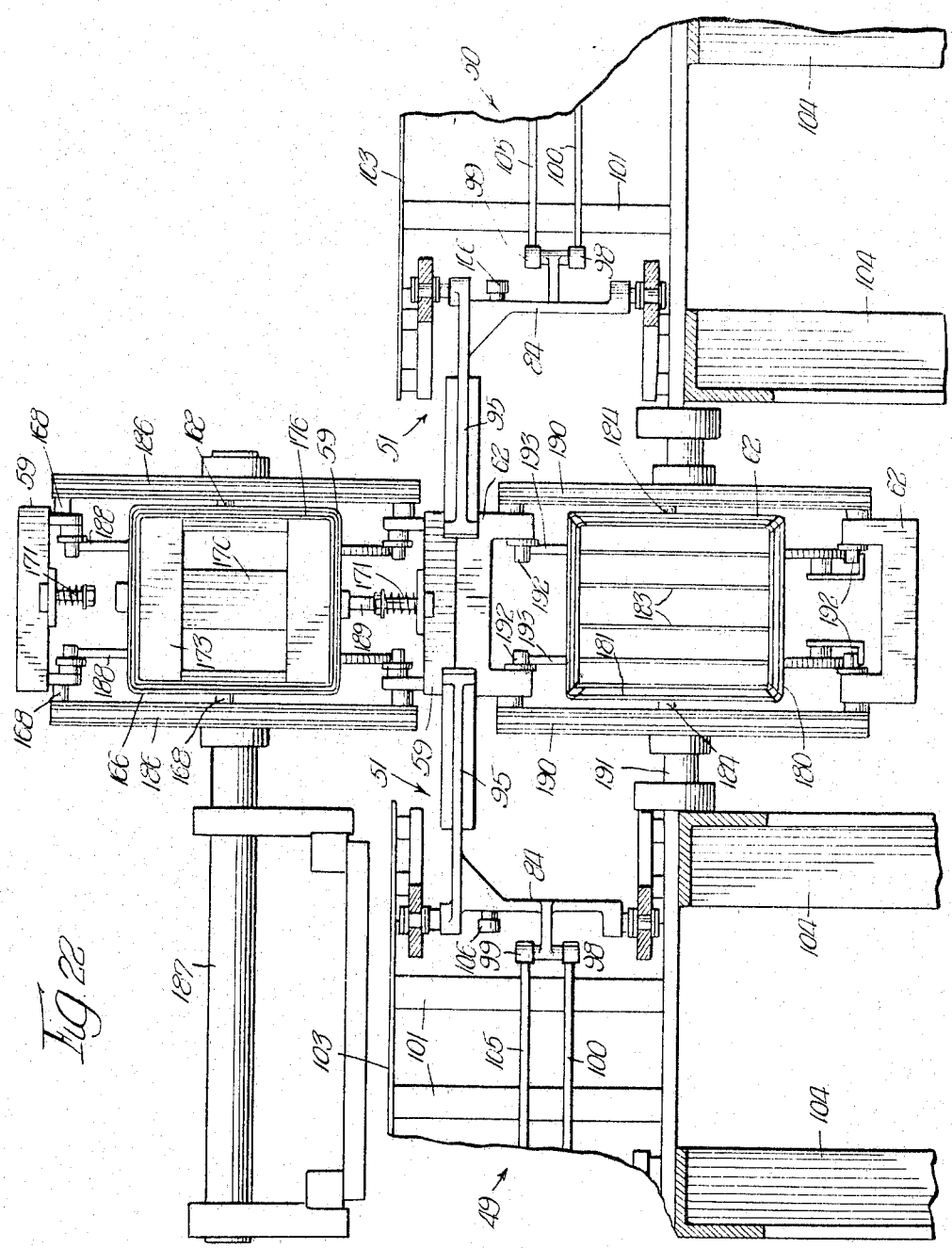

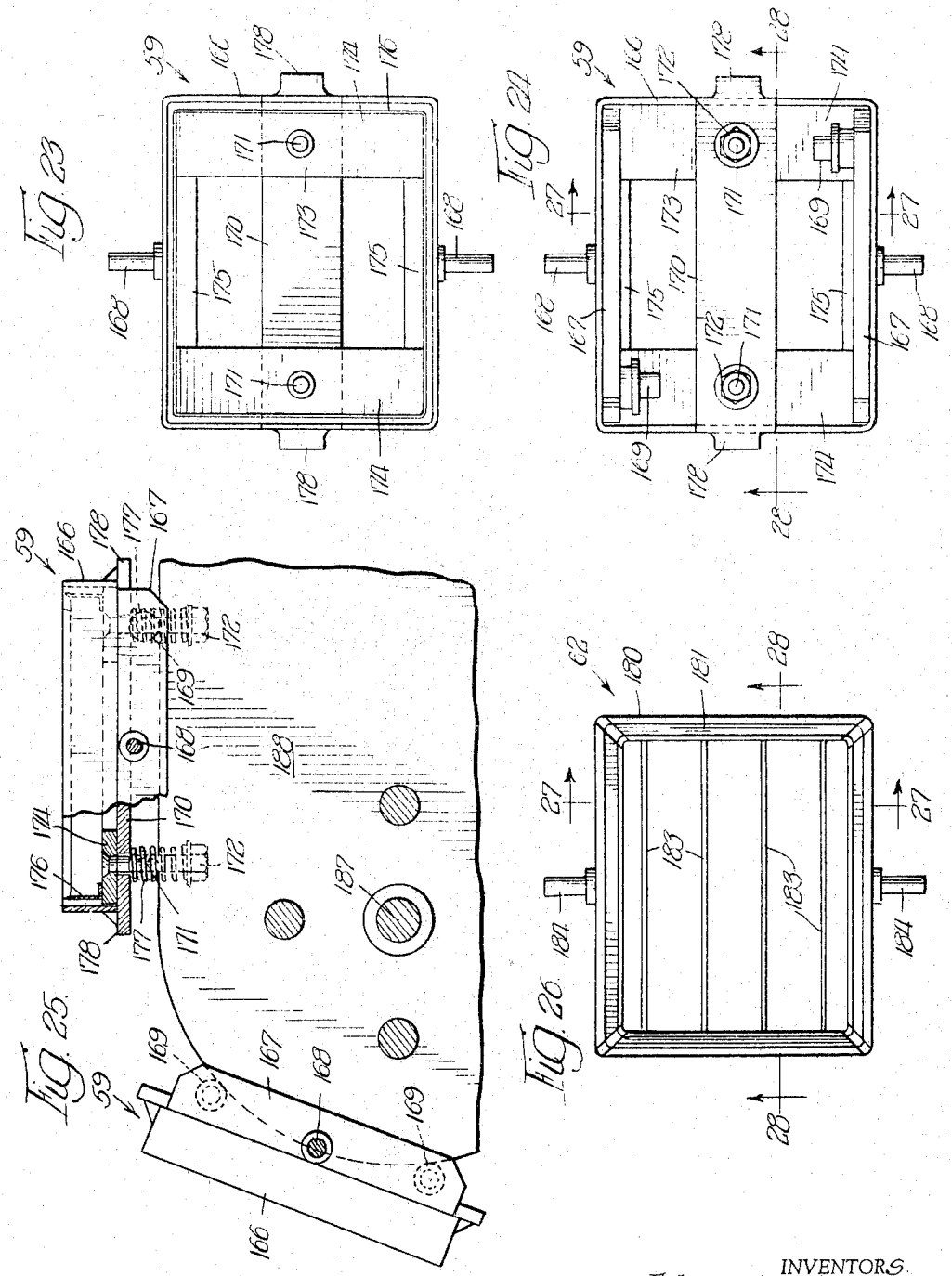

United States Patent Office 3,289,512
Patented Dec. 6, 1966

3,289,512
APPARATUS FOR SEPARATING SPACED PACK-
AGES FROM A CONTINUOUS MOVING FILM OF
PACKAGING MATERIAL
Edward C. Sloan, Augustus H. Eberman, and Hans A.
Jensen, Madison, Wis., assignors to Oscar Mayer & Co.,
Inc., Chicago, Ill., a corporation of Illinois
Original application May 29, 1962, Ser. No. 205,818, now
Patent No. 3,195,288, dated July 20, 1965. Divided
and this application Sept. 28, 1964, Ser. No. 399,582
2 Claims. (Cl. 83—326)

This is a division of Patent No. 3,195,288, issued July 20, 1965, which in turn is a division of Patent No. 3,083,106, issued Mar. 26, 1963.

The present invention relates, generally, to innovations and improvements in package forming apparatus.

In the aforementioned patents, we disclose package froming apparatus of a nature particularly adapted for use with polyvinylidene chloride film in its supercooled state. Such film is formed from vinylidene chloride-vinyl chloride copolymers such as "Saran" manufactured by Dow Chemical Company of Midland, Michigan. Polyvinylidene chloride films have been found to be suitable for use in the packaging of spoilable food products. In its supercooled state, polyvinylidene chloride film may be readily combined to form a hermetic package without the necessity of use of either a direct heat sealing or high frequency sealing method.

It is an object of the present invention to provide new and improved package forming apparatus capable of handling and utilizing supercooled polyvinylidene chloride film, such apparatus specifically including new and improved film handling and package separation means.

Another object of the present invention is to provide new and improved appartus capable of continuously and automatically forming, handling and separating packages, the apparatus including new and improved package holding and separating elements.

Other objects not specifically set forth will become apparent from the following detailed description made in conjunction with the drawings, wherein:

FIGS. 1A and 1B in combined form constitute a side elevational view of apparatus incorporating an embodiment of the present invention, certain parts being shown diagrammatically and certain other parts being shown partially broken away or in section, the left-hand portion of FIG. 1B being a continuation of the right-hand portion of FIG. 1A as viewed;

FIG. 2 is a fragmentary top plan view of the package forming and handling portion of the apparatus of FIGS. 1A and 1B;

FIG. 3 is an enlarged fragmentary perspective of the product loading portion of the apparatus;

FIG. 4 is a fragmentary top plan view of the product loading portion shown in FIG. 3;

FIG. 5 is an enlarged fragmentary perspective of a portion of the apparatus illustrating the loading of the product intermediate spaced continuous films and the manner in which the independently movable die forming elements cooperate to continuously form package-forming dies;

FIG. 6 is an enlarged, partially diagrammatic elevational section of the apparatus taken generally along line 6—6 in FIG. 1B;

FIG. 7 is an enlarged fragmentary perspective of a portion of the apparatus illustrating the means for controlling movement of certain of the die forming elements;

FIG. 8 is a top plan view of one form of top plate constituting a die forming element;

FIG. 9 is an end elevation of the top plate of FIG. 8;

FIG. 10 is a top plan view of one of the bottom plates constituting one of the die forming elements;

FIG. 11 is an end elevation of the bottom plate of FIG. 10;

FIG. 12 is a top plan view of one of the fork members constituting one of the die forming elements;

FIG. 13 is an end elevation of the fork member of FIG. 12;

FIG. 14 is an enlarged rear face elevation of an end gasket structure forming a part of the fork member of FIGS. 12 and 13;

FIG. 15 is a longitudinal section of the end gasket structure of FIG. 14 taken generally along line 15—15 therein;

FIG. 16 is an enlarged fragmentary side elevation of a portion of the fork member of FIG. 12 as viewed generally along line 16—16 in FIG. 12;

FIG. 17 is a fragmentary vertical section of a completed package forming die illustrating cooperating functioning of the various die forming elements comprising the same, this section being taken generally along the transverse center line of the various die forming elements as indicated by the section lines 17—17 in FIGS. 8 and 12;

FIG. 18 is a fragmentary vertical section of a completed package forming die similar to the illustration of FIG. 17, the transverse section of FIG. 18 having been taken generally along lines 18—18 as shown in FIGS. 8 and 12 through each of the die forming elements illustrated in FIG. 18;

FIG. 19 is a top plan view of one form of package formed by the apparatus illustrated;

FIG. 20 is a side elevation of the package of FIG. 19;

FIG. 21 is a transverse section of the package of FIG. 19 taken generally along line 21—21 therein;

FIG. 22 is a enlarged fragmentary end elevation of the apparatus illustrating the operation of the package holding and separating unit thereof;

FIG. 23 is an enlarged bottom plan view of one of the die elements of the package holding and separating unit;

FIG. 24 is a top plan view of the die element of FIG. 23;

FIG. 25 is an enlarged, partly sectioned fragmentary side elevation of a portion of the package holding and separating unit illustrating operation of the die element of FIGS. 23 and 24 therein;

FIG. 26 is an enlarged top plan view of the other form of die element of the package holding and separating unit;

FIG. 27 is a fragmentary elevational section of the combined die elements of FIGS. 24 and 26, the section being taken generally along lines 27—27 of these views; and FIG. 28 is a fragmentary elevational section at right angles to that of FIG. 27 as viewed along lines 28—28 of FIGS. 24 and 26.

Referring to FIGS. 1A and 1B, the continuous package forming apparatus disclosed is diagrammatically illustrated for purposes of generally describing its function. The numeral 25 generally designates a diagrammatically illustrated polyvinylidene chloride film forming means which includes three hoppers, each of which is identified by the numeral 26, into which ground, powder-like polyvinylidene chloride resin is fed and delivered into separated portions on an extruder supply means 27 which communicates with a series of separate film extruding members 28, 29 and 30.

A separate supply hopper 26 is illustrated in FIG. 1A for each film extruding member to handle, each different compositional type of polyvinylidene chloride film used in carrying out the preferred package formation procedure of the present invention. In this respect, FIG. 1A illustrates the use of separate extruding members 28–30 to supply films of different properties, although it will be understood that two separate single films can be used if desired where it is unnecessary to establish special hermetic sealing conditions or other specific characteristics in the packages formed. The extruding members 28 and 30 function to supply continuous oxygen barrier films which preferably will have a composition of approxiamtely 90% vinylidene chloride and 10% vinyl chloride whereas the extruding member 29 is provided with two extruding die slots to supply two separate films which each exhibit a high degree of flexibility and which preferably have a composition of approximately 68% vinylidene chloride and 32% vinyl chloride. As illustrated in FIG. 1A, the oxygen barrier films are each designated by the numeral 31 whereas the highly flexible films are each designated by the numeral 32.

Immediately upon forming the films 31 and 32, the same are introduced into a supercooling water bath 33 contained by a tank 34 in which spaced pairs of combining rollers 35 and 36 are mounted and driven by suitable means. The oxygen barrier film 31 formed by the extruding member 28 and one of the highly flexible films 32 formed by the extruding member 29 are laminated by contacting the same between the pair of rollers 35 and the resulting laminated film 37 constitutes the bottom sheet for use in package formation. The remaining continuous films 31 and 32 formed by the extruding members 30 and 29, respectively, are laminated by being passed through the paired rollers 36 and the resulting laminate 38 constitutes the top sheet or film used in the package process.

The laminated films 37 and 38 are moved through the supercooling bath 33 to the extent desired whereby the temperature of the same is reduced or held at a low enough degree to retard crystallization of the films and retain the self-adherence or self-fusing properties for packaging purposes. These properties result in immediate fusing between the films 31 and 32 within the supercooling bath 33 resulting in the formation of the laminated sheets 37 and 38. The combining rollers 35 and 36 are driven at an appropriate speed to hot stretch the films 31 and 32 as they are received from their respective extruding members after which the laminated films 37 and 38 are fully supercooled to the extent desired. Hot stretching is relied upon to establish the desired film thickness for package formation.

The laminated films 37 and 38 are moved through the supercooling bath 33 and guided by spaced rollers 39 and 40, respectively, these rollers functioning to retain the films in the supercooling bath 33 for a time adequate to establish the supercooled properties of the film for subsequent use while at the same time preventing contact between the films. The films 37 and 38 are subsequently delivered from the supercooling bath 33 onto conveyor belt assemblies 41 and 42, respectively, and the bottom film 37 moves over a supporting roller 43 into contact with a plurality of continuously moving bottom die forming plates 44 which are suitably attached to a chain drive in a manner to be described, driven by spaced drive means in the form of paired sprockets 45 and 46, the sprocket 46 being located near the middle of the apparatus as shown in FIG. 1B. The bottom die forming plates 44 are arranged in an endless series for continuous movement throughout the length of the package forming portion of the apparatus including return of the same in inverted position underneath the apparatus for continuous re-use.

The bottom film 37, as previously described, is continuously delivered into surface engagement with the continuous series of bottom plates 44 and a product 47, such as a plurality of wieners arranged in side-by side relation, is delivered onto each of the spaced top portions of the continuous bottom film 37 contacting each top flat surface of the plates 44. Automatic product delivery means of any suitable type, the location of which is diagrammatically illustrated in FIG. 1A and identified by the numeral 48, feeds a product onto each bottom plate 44 following bottom film contact with the same. A specific form of product loader 48 will subsequently be described, this form being particularly adapted for use with the packaging apparatus of the present invention and constituting a part of said invention.

Referring particularly to FIG. 2, the general arrangement of the packaging apparatus is illustrated as including the series of continuously moving bottom plates 44 extending longitudinally of a substantial portion of the apparatus and centrally thereof. To each side of the series of bottom plates 44 are package forming die side wall defining assemblies generally designated by the numerals 49 and 50 which include basically a plurality of continuously moving fork members 51 which move substantially transversely into and out of die forming relation with the bottom plates 44. The structural details and movement control features of the paralleling fork assemblies 49 and 50 will subsequently be described in detail, but for general understanding or arrangement and functioning of the package forming apparatus, FIG. 2 illustrates the relative positioning of the die side wall defining assemblies 49 and 50 relative to the bottom die forming plates 44. From the illustration in FIG. 2, it will be appreciated that the separate series of fork members are arranged for synchronized movement with the continuous series of bottom plate 44 and oppositely positioned forks 51 move into paired relation over each bottom plate 44 to define converging side wall portions during die formation. In FIG. 2 it will be further understood that the bottom plates 44, as illustrated, are arranged for movement from left to right as viewed therein. The forks 51 of each assembly 49 and 50 are suitably driven to move with the plates 44 centrally of the packaging apparatus, the forks 51 being continuously returned along either side of the apparatus in the direction of the arrows in FIG. 2.

The mating of the forks 51 and the bottom plates 44 is gradual as illustrated in FIG. 2 with the forks 51 being moved diagonally in paired relation into superimposed position relative to the bottom plates 44 and on top of the bottom film 37 in engagement therewith. Special means are provided to raise the forks 51 prior to their movement over the bottom sheet 37 to avoid scraping or bunching the same and further means are provided to subsequently lower the forks 51 in paired relation into engagement with the bottom sheet 37 following proper positioning of the forks in such a manner as to define the side walls of each package forming die. The particular means for raising and lowering the forks 51 will be subsequently described in detail. The forks 51 are angularly brought into die forming relation with the bottom plates 44 so as to enclose the products 47 therebetween without contacting the products.

The top film 38, as shown in FIG. 1A, is continuously delivered into covering relation with the paired forks 51 following completion of movement of the forks into side enclosing relation with the package forming dies being assembled. A top sheet guide roller 52 directs the top sheet 38 into covering relation with the paired forks 51 positioned over each bottom plate 44. Continued movement of the package forming dies, which are assembled to the extent described, brings the same into association with a continuously moving endless series of die forming top lates 53 positioned overhead relative to the bottom plates 44 and forks 51. The top plates 53 are mounted in any suitable manner, such as on endless chains operated by front and rear pairs of drive sprockets 54 and 55. Direction of rotation of the sprockets 54 and 55 is indicated in FIGS. 1A and 1B by the arrows therein and any suitable means may be used to supply power to the same. The top plates are driven at a rate equal to the rate of movement of the bottom plates 44 and forks 51 and are synchronized with the same so as to continuously move into die enclosing relation against the top surfaces of the top sheet 38 to clamp the same against the top surface of the paired forks already positioned relative to bottom plates 44. Thus, each package forming die is completed with the product 47 enclosed thereby and package formation can be automatically initiated and completed in a manner to be described.

The top plate assembly has associated therewith, as shown in FIG. 1A, a known type of rotary valve assembly 56 which is connected by separate series of three flexible tubes or hoses 57 to each of the top plates 53. The operation of the valve 56 is synchronized with the movement of the top plates 53 and the assembled dies are evacuated, swept with an inert gas, and further evacuated with automatic package formation resulting by use of the rotary valve assembly 56 which has associated therewith conventional vacuum impressing means, an inert gas supply or any other suitable means capable of supplying gas or vacuum for package forming purposes. The manner in which vacuum is impressed or inert gas is delivered to the assembled dies through the rotary valve assembly 56 and the flexible tubes 57 will be described in detail, the general arrangement being substantially the same as that disclosed in our copending application referred to above.

Following the package forming operation which occurs during association of the top plates 53 with the bottom plates 44 and paired forks 51, the formed packages surrounded and supported by the paired forks 51 continuously move out of association with the top and bottom plates 53 and 44 as shown in FIG. 1B. At this stage of the package forming operation the continuous sheets of film 37 and 38 are unbroken but are subdivided into longitudinally spaced, interconnected packages. The supercooled properties of the films still exist and have been utilized in forming the packages while the same were completely enclosed within the dies formed by the various cooperating elements previously described. It is now preferred to advance crystallization of the films adequately to destroy or overcome the supercooled properties thereof and remove any self-coherence tendencies. Crystallization can be furthered by heat alone without it being necessary to stretch the films and heat is preferably used without attendant stretching to prevent distortion of the packages formed.

As illustrated in FIG. 1B, the supported packages move under a heating element 58 which may be of any desired length to heat the package films to the requisite crystallization temperature. To provide for fork removal and package separation from the continuous films, a package holding and separation assembly is preferably used subsequent in operative location to that of the heating element 58. This assembly includes the use of a plurality of top die elements 59 which are carried by a suitable continuously moving endless belt or chain assembly driven by rollers or paired sprockets 60 and 61 continuously into and out of package surrounding relation within the paired forks 51. The top die element assembly is of similar operative arrangement as the previously described series of top plates 53 with the main difference being that each top die element carries cam operated knife blades for package separation purposes in a manner to be described. Associated with the top die element assembly is a cooperating bottom die element assembly including chain driven bottom die elements 62. Sprockets 63 and 64 drive the die elements 62 in the direction indicated for synchronized cooperation with the top die elements 59 to completely enclose the packages therebetween within each pair of forks 51. The paired die elements 59 and 62 clamp each package for fork removal without package film distortion or damage while separating each package from the continuous films upon cam operation of the knife blades of the top die elements.

Upon clamping of the film immediately surrounding each package, the paired forks 51 automatically separate from one another and the forks move transversely outwardly out of association with the completed packages 65 and are returned to the front end of the apparatus for re-use as illustrated in FIG. 2. A completely separated package 65 is held in each bottom die element 62 and subsequently delivered therefrom onto a conveyor 66 upon separation of the die elements 59 and 62 as shown in FIG. 1B. The combined films 37 and 38 are still unbroken although the spaced packages have been removed therefrom. The marginal or waste film identified by the numeral 67 is wound upon a spindle 68 and may be re-used by introducing the same into a shredder from which ground, powder-like polyvinylidene chloride resin is recycled for blending with virgin stock followed by feeding to the hoppers 26. The package forming operation is thus completed and the individual packages are in condition for handling for shipping and merchandising purposes.

As previously described, any suitable product loading mechanism can be used with the apparatus of the present invention in order to deliver in a continuous, synchronized manner a product onto the portions of bottom film 37 supported by each bottom plate 44. FIGS. 3 and 4 illustrate a preferred type of product loading mechanism 48 which forms a part of the present invention and which includes an elongated drive mechanism housing 73 having rounded ends and being supported by a surface plate 74 forming a part of the packaging apparatus and suitably supported by the main frame thereof. The housing 73 is open along all sides thereof having received therealong a continuous, flexible belt-like structure defined by a plurality of vertically directed flat plates 75 which are suitably spaced from and interconnected with one another by spaced chains or other similar means of belt-like arrangement. In this manner the plates 75 are mounted for continuous movement along the sides of the housing 73 including flexing movement around the ends thereof. Any suitable drive arrangement can be used for continuous movement of the arrangement defined by the plates 75, such drive arrangement utilizing, for example, spaced sprockets at each end of the housing 73 the locations of which are indicated by the vertical shafts 76 and 77.

Included among the series of plates 75 are a plurality of spaced plates 78 which are of less width than that of the plates 75 and which have journaled therethrough radially outwardly directed pins 79 each of which have attached at the outermost ends thereof a flat downwardly and outwardly extending pusher-type blade 80. The product loading mechanism 48 is provided with suitable camming means (not shown) for automatically and periodically pivoting each pin 79 during continuous peripheral movement of the same along the housing 73, the pivoting of each pin 79 resulting in pivotal movement of the pusher blade 80 carried thereby into a substantially flat horizontal plane as illustrated in the right-hand portion of FIGS. 3 and 4 during movement of each blade 80 substantially transversely over a bottom plate 44. Each blade 80 will normally be positioned in a substantially vertical plane during movement of the same for product engaging and pushing but is automatically pivoted into a substantially horizontal plane following the depositing of a product 47 onto a bottom plate 44 to thus allow the blade 80 to clear the top of the product 47 and to prevent displacement of the product from the bottom plate.

The supporting surface 74 has an opening 81 therein located on the product delivery side of the mechanism 48 and extending directly over the top central portion of the continuous series of bottom plates 44 on which the bottom film 37 has been delivered. The opening 81 is in the form of a rectangular slot-like area in which a plurality of rollers 82 are suitably mounted. The rollers 82 are freely rotatable about their respective mounting shafts and the pusher-type blades 80 move over the series of rollers 82 in close association therewith to engage products 47 deposited on the rollers 82 and move the products in the same direction as that of the series of bottom plates 44 to continuously deliver a separate product 47 on the area of bottom film 37 received on the top surface of each bottom plate 44 in centrally positioned relation thereto as shown in FIGS. 4 and 5. Due to the substantially friction-free operation of the rollers 82, the products 47 are readily moved therealong by the contacting blades 80 and subsequently delivered onto each bottom plate 44. Once complete delivery of a product 47 onto a bottom plate 44 has been accomplished, the pusher blade 80 delivering the product is automatically pivoted into a substantially horizontal plane so as to pass over the product and return for re-use in delivering another product to another bottom plate in a continuous, uninterrupted manner. Immediately following product delivery, each pusher blade 80 is pivoted back into its substantially vertical position for subsequent contact with another product to deliver the same in the manner described. The top film 38 is delivered above the product loading mechanism 48 in the manner previously described by the conveyor 42 for contact with the top plates 53.

FIG. 5 illustrates the manner in which the various die forming elements are continuously brought together to form a packaging die which encloses spaced portions of the bottom and top films 37 and 38 with a product 47 positioned intermediate these portions. As previously described, a product 47 is delivered onto the top surface of the portion of bottom film 37 engaging the top surface of each bottom plate 44 and a side wall defining fork 51 is moved in a substantially transverse direction into engagement with each bottom plate 44 relative to the film portion and product received thereon. The separate fork assemblies 49 and 50 are synchronized in operation with the continuously moving bottom plate series and product delivery mechanism 48 to cause continuous formation of a plurality of package forming dies in the sequence described. Following end face engagement of each pair of side wall defining forks 51 relative to each bottom plate 44, the top film 38 is delivered into engagement with the top surfaces of the paired forks 51 and a top plate 53 moves downwardly into die completing position to enclose the top of each package forming die and engage the top film portion forming a part thereof. The top plate assembly is driven by suitable means mounted in a housing 83 forming a part thereof. The roller 52 receives the top film 38 thereunder to bring the same into engagement with the top surfaces of the paired forks 51 prior to receiving a top plate 53 in die enclosing relation therewith.

As particularly shown in FIGS. 6, 7 and 13, each fork 51 is provided with a vertically directed body portion 84 which at the bottom thereof has integrally formed therewith a radially outwardly directed ear portion 85 which is centrally apertured for receiving therethrough a pin 86 (see FIG. 6) which attaches the lowermost end of each fork 51 to a link chain 87 suitably driven by sprockets forming a part of each of the fork assemblies 49 and 50. The sprockets are in driving engagement with any siutable form of power means such as an electric motor. The top end of the body portion 84 of each fork 51 has integrally formed therewith a radially directed neck portion 88 which projects radially outwardly of the body portion 84 in opposite directions, the rearmost portion defining an ear 89 which is centrally apertured and which is located directly above the ear 85, each of these ears being vertically aligned relative to a common vertical axis. The top ear 89 of each fork 51 has received therein a pin 90 which is attached to a link chain 91 which forms a part of each fork assembly 49 and 50 and parallels the direction of movement of the lower chain 87 in vertically spaced relation thereto so as to mount the forks 51 in side-by-side relation for continuous movement along the sides of the fork assemblies in the manner previously described. The top chains 91 of each assembly are suit- ably driven by sprockets carried by the same shaft as the sprockets which drive the bottom chains 87. Referring to FIG. 2, each fork assembly 49 and 50 is illustrated as being provided with vertical end shafts 92 and 93 on which the chain driving sprockets are mounted, the top sprockets 94 being illustrated in broken lines in driving engagement with the top chains 91.

The neck portion 88 of each fork 51 has integrally formed therewith at the end thereof opposite the ear 89 a pair of radially outwardly directed fork arms 95 which cooperate to define an outwardly opening, substantially U-shaped area the inner periphery of which constitutes one-half of the die assembly side wall. The oppositely positioned forks 51 of the cooperating assemblies 49 and 50 function upon paired engagement in the manner described to complete the side wall assembly of each die during die formation. At substantially the mid-point of the body portion 84 of each fork 51, an integrally formed, radially inwardly directed pair of divergent ears 96 and 97 are provided for the mounting of rotatable cam followers 98 and 99, respectively. The cam followers 98, as particularly shown in FIG. 6, are in engagement with the outer edge of a cam track 100 which is in the form of a continuous strip coinciding with the outer periphery of each fork assembly 49 and 50 and being supported therein by a plurality of spaced posts 101 which are suitably carried between a transverse bottom plate 102 and a centrally interrupted top plate 103. The bottom plate 102 extends centrally through the continuous path of movement of the series of bottom plates 44 without interfering with the operation of the same and extends beneath each of the side fork assemblies 49 and 50 as shown in FIG. 6. The bottom plate 102 is further supported by main frame members 104 which form a part of the main frame supporting the entire package forming member.

The cam followers 99 of the forks 51 are in engagement with the outer edge of a continuous cam track 105 included in each fork assembly 49 and 50. The cam track 105 is of structural arrangement similar to the cam track 100 being generally formed from a continuous strip of metallic plate which follows the periphery of each fork assembly 49 and 50 to provide a continuous outer edge in guiding engagement with each fork 51 during movement of the same. The cam followers 98 and 99 cooperating with the cam tracks 100 and 105, respectively, function to guide each fork 51 about the outer side periphery of each assembly 49 and 50 for die forming operation. The provision of the divergent ears 96 and 97 on which oppositely directed cam followers are mounted imparts stability to the operative movement of each fork 51 while guiding the same around the rounded opposite ends of each fork assembly 49 and 50. With this arrangement positive stabilized control of operative functioning of each fork 51 is obtained in an uncomplicated, substantially maintenance-free manner.

The body portion 84 of each fork 51 has further attached thereto a radially inwardly directed cam follower assembly 106 which is located intermediate the top ear 89 and the cam followers ears 96 and 97. The assembly 106 includes a cam follower which is mounted for rotation about a horizontal axis and which further is radially inwardly directed relative to the body portion 84 on which the same is mounted. As previously described, it is necessary to raise each fork 51 during movement of the same into die forming position relative to the bottom film 37 and a bottom plate 44. The raising of the fork 51 provides for uninterrupted or contact-free movement of the arms 95 thereof over the top of the portion of bottom film 37 carried on the top surface of a bottom plate 44. The movement of the fork arms 95 relative to the bottom plate 44, with which they cooperate to define a package forming die, is such that during this relative movement the fork arms 95 should not be in contact with the bottom film 37 in order to prevent stretching and bunching of the bottom film 37 or other damaging action to the same. Following completion of movement of each fork 51 into its proper position over the top of a bottom plate 44 and into engagement with its oppositely positioned fork 51, it is necessary to lower each fork 51 in a vertical direction to engage the bottom surface of the same with the portion of the film associated with the top surface of the bottom plate 44.

FIG. 7 best illustrates the manner in which each fork 51 is automatically raised and lowered during positioning of the same for die forming purposes. Each fork assembly 49 and 50 includes a camming plate 107 which is located at the forward end of the assembly mounted about the shaft 92 and positioned above the cam track 105 for engagement by the cam follower 106 of each fork 51. Movement of each fork along the outer side of each fork assembly 49 and 50 in a direction towards the front end portion of the same eventually results in engagement between the cam follower 106 of each fork 51 with an end of the cam plate 107, which end as shown in FIG. 7 is downwardly offset to define a sloping cam track surface 108 which is sufficiently depressed along its outermost edges to be received under each cam follower 106. Continued movement of the fork 51 results in its being raised by the camming action of the inclined surface 108 with the cam follower 106 moving upwardly therealong onto the top edge surface of the cam track 107. Each fork 51 is mounted relative to its bottom and top driving chains 87 and 91 to permit vertical reciprocal movement of the fork therebetween for lifting and lowering purposes. The mounting ears 85 and 89 having the chain attaching pins 86 and 90 received therein move relative to the pins upwardly to provide for adequate lifting of the fork 51 to permit the bottom surface of the arms 95 thereof to clear the bottom film 37 during movement of the fork into its operative position. The lifting cam track 107 is continuous about the rounded forward end of each fork assembly 49 and 50 to an extent that each fork 51 is held in its raised position until the outer end surfaces of the arms 95 thereof are brought into abutting engagement with the end surfaces of an oppositely paired fork 51 of the opposite assembly.

Following end face engagement of the paired arms 95 of oppositely positioned forks 51 and prior to contacting of the top film 38 with the top surfaces of the paired forks, each fork moves into operative association with a fork lowering cam element or block 109 which is illustrated in FIG. 7. The block 109 is mounted along the inner side of each fork assembly 49 and 50 and is provided with an inclined, radially inwardly directed projection 110 under which the cam follower 106 of each fork 51 moves. The inclination of the under surface of the projection 110 is such that the cam follower 106 and associated fork structure is forced downwardly and the fork is lowered into bottom surface sealing engagement with the bottom film portion received over the top face of its associated bottom plate 44. The camming action of the block 109 is such that each fork 51 is moved downwardly into engagement with the bottom film 37 in a relatively quick manner. The weight of each fork 51 aids in the camming action of the block 109 and, under normal circumstances, this weight may be adequate alone to cause each fork to move downwardly into its original position following movement of the cam follower 106 off of the opposite end of the cam track 107 and out of supported engagement therewith. However, to assure quick responsive fork lowering action, the use of the cam block 109 is preferred, this block functioning to prevent inadvertent retention of a fork 51 in its raised position relative to its associated bottom plate 44. It will be understood that the fork lowering block 109 is not necessary to efficient functioning of the apparatus but is merely a preferred part thereof. In this connection, subsequent combining of the top plates 53 with the paired forks 51 will result in fork lowering in the event of sticking of the same.

FIGS. 5, 6, 8 and 9 illustrate the important structural features of the top plates 53 with respect to the manner in which the same are mounted in the package forming apparatus. Each top plate 53 is provided with a flat bottom surface 111 which defines the inner top surface of each package forming die. The outer surface of each plate 53 is provided with a pair of mounting ears 112 which are positioned centrally along side margins of the plate. Each mounting ear has attached thereto a radially inwardly directed pin which is fastened to a link of a continuous chain 113 which is driven by the drive means 54 and 55 diagrammatically illustrated in FIGS. 1A and 1B, the means 54 being more specifically illustrated in FIG. 5 as a sprocket mounted on a shaft 114 which is driven by suitable power means enclosed in the housing 83.

As illustrated in FIG. 6, a support rail 115 is located intermediate the drive sprockets 54 and 55 along both the upper and lower paths of top plate movement to support the chains 113. The track supports 115 are mounted in spaced relation by a plurality of frame members 116, only one of which is shown in FIG. 6. Each frame member 116 is provided with a threaded adjustment member 117 at the bottom thereof for adjusting vertical positioning between the paired chained supports 115 carried by transverse arms 118 forming a part of the frame structure. The threaded adjustment members 117 are used to provide for slack or to take up slack in the link chains 113 and provide the requisite sealing compression for the combined top and bottom plates and intermediate paired forks.

Each top plate 53 is further provided in a corner thereof on the outer surface opposite the flat surface 111 with a cam follower mounting ear 119 which in FIG. 6 has mounted thereto a pair of cam followers 120 which have received therebetween a continuous cam track 121 supported by a frame member 122. The cam track 121 is in the form of a continuous inwardly directed flange which follows the contour of the top plate assembly. The paired cam followers 120 of each top plate 53 being received on opposite surfaces of the track 121 hold plate 53 in its proper operative position during continuous movement of the same. In this manner the series of top plates 53 continuously move into and out of die forming engagement with the top surfaces of paired forks having the top film 38 received therebetween with a product 47 suitably received within the package forming cavity.

Each bottom plate 44 as shown in FIGS. 5, 6, 10 and 11 are constructed somewhat similarly as the top plates previously described. Each bottom plate 44 is provided with a top flat surface 123 which constitutes the bottom inner surface of a package forming die. The opposite surface of each bottom plate 44 is provided with a pair of oppositely positioned mounting ears 124 located at substantially the mid-points along opposite side margins of the plate and being pin connected to continuous link chains 125. The chains 125 are substantially longer than the chains 113 due to the much greater longitudinal movement of the bottom plates 44 along the length of the packaging apparatus. Similarly as with the top plate chains 113, the chains 125 are sprocket driven by suitable means such as 45 and 46 of FIGS. 1A and 1B at opposite ends of the package forming portion of the apparatus. Intermediate the drive sprockets 45 and 46, the chains 125 are supported on tracks 126 along the uppermost path of movement of the bottom plate assembly, the track 126 being carried by support members 127 extending upwardly from the transverse frame plate 102. The lowermost path of travel of the bottom plate 44 includes chain tracks 128 hung on downwardly directed frame members 129 attached to the transverse frame plate 102. A corner of the surface carrying the paired attaching ears 124 of each bottom plate 44 is provided with a cam follower attaching ear 130 which, similarly as the ear 119 of each top plate 53, has attached thereto a pair of cam followers 131 which are received on opposite surfaces of a cam track 132 suitably supported by the transverse frame plate 102. The cam track 132 is continuous throughout the entire endless path of travel of the series of bottom plates 44 and the paired cam followers 131 of each bottom plate 44 in engagement with the track 132 provides for controlled movement of each bottom plate 44 into and out of package forming and handling position.

The manner in which the packages 65 are continuously formed while taking full advantage of the supercooled properties of polyvinylidene chloride film is of particular importance in connection with a full understanding of the present invention. Referring particularly to FIGS. 8, 9, 17 and 18, each top plate 53 is provided along one side margin thereof in close association with an attaching ear 112 with three drilled openings or passageways 133, 133' and 134 which have threadedly received therein attaching nipples 135 of the ends of flexible hoses 57.

FIG. 6 illustrates the previously described arrangement whereby the flexible hoses 57 extend from each top plate 53 to the rotary valve structure 56 which includes a rotary valve element 137 operatively mounted on a drive shaft 136 suitably driven in synchronized relation with the driving of the series of top plates 53 to rotate the valve element 137 of the assembly 56 relative to a gas supply or vacuum impressing stationary chamber 138 forming a part of the assembly 56. Rotation of the valve element 137 relative to the chamber 138 provides for sequential inert gas sweeping and vacuum impressing for package forming purposes in a manner to be described. This type of valve assembly is well known and for the purposes of the present invention, it will be understood that any suitable means of providing sequential vacuum impressing and inert gas sweeping operation of the type to be described can be used in carrying out the teachings of the present invention. The groups of flexible hoses 57 generally follow the path of movement of each top plate 53 with which they are interconnected so as to avoid twisting or otherwise fouling of the connections between the top plate and the rotary valve element 137.

The passageway 133 in each top plate 53 is in communication with a radially inwardly directed passageway 139 which extends to the center of the top plate 53 and in turn communicates with a vertically directed passageway 140 opening centrally outwardly of the flat surface 111 of the top plate. The drilled passageway 133 further communicates with a vertically directed passageway 141 opening outwardly of the flat surface 111 in close association with the side margin thereof along the side to which the hoses 57 are attached. The passageway 133' is in communication with a transverse passageway 139' which communicates at the opposite end thereof with a vertical passageway 140' opening outwardly of the flat surface 111 on the opposite side area thereof. As shown in FIG. 18, the drilled opening 134 is solely in communication with a separate vertically directed passageway 142 which opens outwardly of the flat surface 111 along the side margin of the top plate 53, and the passageway 142 parallels passageway 141 but is completely out of communication therewith.

In FIGS. 12, 13, 17 and 18, the forks 51 are illustrated as including bosses 143 formed integral on opposite surfaces of the neck portion 88. These bosses function to stabilize die formation and are contacted by the oppositely positioned flat surfaces 111 and 123 of the top and bottom plates, respectively. The bosses 143 of the forks 51 of the fork assembly 50 are provided with laterally spaced, vertically directed drilled passageways 144 and 145 which in die assembled relation are vertically aligned and in communication with the passageways 141 and 142 of a top plate 53, respectively. These passageways carry gaskets for establishing sealed communication between passageways. The passageway 144 extends entirely through the oppositely directed bosses 143 opening outwardly of the top and bottom surfaces thereof. The passageway 145 extends downwardly to approximately the mid-point of the paired bosses 143 without being extended through the bottom surface thereof. The forks 51 of the assembly 49 each carry a vertical passageway 144' in communication with passageway 140' of the top plates 53. Passageway 144' extends downwardly of the boss 143 to the mid-point and also carries a gasket.

Centrally of the inner peripheral surface of each fork 51 at substantially the mid-point thereof is a continuous slot or groove 146, the groove 146 of a pair of forks 51 defining the side walls of a package forming die cooperating to substantially surround the inner package forming area or cavity. The groove 146 of fork 51 forming a part of the fork assembly 50 is in communication with a radially inwardly directed passageway 147 shown in FIG. 18, which passageway is at its opposite end in communication with the vertical passageway 145. The grooves 146 of the forks 51 of the assembly 49 are in communication with inwardly directed passageways 147' which communicate with passageways 144'.

As particularly shown in FIGS. 12 and 13, the top and bottom surfaces of the arm defining portion of each fork 51 are provided with gasket seating grooves receiving therein a compressible gasket 148 extending continuously along these surfaces for sealing engagement with the top and bottom films in association with the top and bottom plates. The continuous gaskets 148 provide top and bottom peripheral seals for vacuum impressing and inert gas flushing of the package forming cavity defined by the completed die assemblies. The outermost end surfaces of each arm 95 of each fork 51 carries a removable end gasket 149 which is in the form of a block of compressible rubber or rubber-like material having imbedded therein a mounting plate 150 shown in FIGS. 14–16 to which is attached a rearwardly extending flatted mounting pin 151 received in a drilled opening 152 extending inwardly from the end face of each arm 95. A set screw 153 is threadedly received in an opening comunicating with the outer surface of each arm 95 for lateral abutment with the flattened surface of the pin 151 to hold the gasket 149 in its operative position on the end face of the arm 95. As shown in FIG. 14, the mounting plate 150 is provided with spaced holes 154 into which the material of the end gasket 149 is molded for fixed retention of the same on the mounting plate 150. Upon pairing of oppositely positioned forks 51 in the manner previously described, end face abutment of the arms 95 thereof result in sealing engagement of oppositely positioned end gaskets 149 to completely seal the side walls of the package forming die.

Referring to FIG. 17, the vertical passageway 144 extending through the neck portion 88 of each fork 51 of the fork assembly 50 is in communication at the top thereof with the passageway 141 of the top plate 53 and is further in communication with a vertical passageway 155 in the bottom plate 44 which opens upwardly onto the flat surface 123 toward the side margin thereof as viewed in FIG. 17. The inner end of the passageway 155 communicates with a transversely inwardly directed passageway 156 which at its innermost end communicates with a vertically upwardly directed passageway 157 opening outwardly of the center of the flat surface 123 substantially in alignment with the passageway 140 of the stop plate 53. A threadedly received plug 158 closes off the outermost end of the drilled passageway 156 to limit communication of the same to the passageway 155. Similarly, in the top plate 53 a threadedly received plug 159 closes off the outermost end of the passageway 139 to limit communication of the same with the passageways 133 and 141.

Package formation is best described in connection with FIGS. 17 and 18, FIG. 17 illustrating the positioning of the top and bottom films 38 and 37 in engagement with the flat inner surfaces 111 and 123, respectively, of the top and bottom plates. The films 38 and 37 are of sufficient width to marginally overlap the top and bottom surfaces of the paired forks 51 to thus be clamped by the gaskets 148 against the surfaces 111 and 123. While any suitable procedure of package evacuation and conditioning may be followed, the procedure to be described is preferred in the formation of a hermetically sealed food package wherein the food products, such as the wieners 47, are packaged.

Immediately upon completion of the assembly of each package forming die, continued rotation of the valve element 137 results in the drawing of a vacuum through all of the flexible hoses 57 connected to each top plate 53. A vacuum is thus drawn through the passageways 139 and 140 resulting in a drawing of the top film 38 into tight engagement with the surface 111 of the top plate 53 to hold the same thereagainst and prevent downward movement of the same within the die cavity. Vacuum is drawn through passageways 141, 144, 155, 156 and 157 to similarly hold the bottom film 37 against the surface 123 of the bottom plate 44 and prevent upward movement of the same into the die cavity. Vacuum is also drawn, as shown in FIGS. 17 and 18, through the passageways 133', 139', 140', 144', 147'; 134, 142, 145 and 147 from within the die cavity to exhaust the same of air trapped therein during the formation of the die. The valving cycle of the valve assembly 56 is such that a slight delay occurs betwen the drawing of the vacuum through the passageways resulting in the holding of the films against their respective die plate surfaces before a vacuum is drawn internally of the die cavity. This slight delay is only momentary and is for the purpose of safeguarding against inadvertent drawing of the films into the die cavity into contact with one another resulting in premature seal formation.

Following evacuation of the die cavity and upon continued movement of the completed dies accompanied by simultaneous movement of the rotating valve element 137 of the valve assembly 56, an inert gas sweeping cycle is commenced through the flexible lines 57 communicating with the pasageways 147 and 147'. Inert gas, such as nitrogen, is introduced into the die cavity through passageway 147 and a vacuum is drawn through passageway 147' to sweep the cavity to further remove any residual oxygen-containing air therein. Simultaneously with this sweeping operation, the vacuum impressed on the films 37 and 38 to hold the same against their respective surfaces is continued. Inert gas sweeping operation is continuous and can be carried out for any desired time period depending upon the type of automatic valving arrangement used.

Once complete sweeping and substantially thorough oxygen removal has been obtained within the die cavity, the final step of package formation is carried out by opening the flexible hose 57 in communication with the passageway 133 to the atmosphere to release the film portions received within the die cavity. Simultaneously, a vacuum is drawn through the flexible hoses 57 in communication with the passageways 133' and 134 to draw a vacuum internally of the die cavity and draw the film portions about the product 47 to complete the package. The bottom film portion 37 is drawn upwardly into intimate and tight contour-assuming association with the bottom surfaces of the product 47 and the top film portion 38 is drawn downwardly into tight contour-assuming, intimate contact with the product 47. Portions of the films are contacted about the edges of the product 47 to define a hermetic seal of either the fused or readily peelable type depending upon the extent to which the supercooled properties of the film have been retained. With the films being in supercooled condition, the stretching of the same occurs to a controlled extent with the marginal edge portions of the continuous sheets being tightly held by the gaskets 148 of the paired forks 51 against the respective plate surfaces.

Upon completion of package formation within each die cavity, the top and bottom film portions are intimately and tightly received about the product 47 in configuration conforming engagement therewith with a peripherally continuous seal automatically formed about the product on all sides thereof, which seal is of substantial radial width as illustrated by the broken lines 160 in FIG. 18. The top and bottom film portions drawn into the die cavity as illustrated in FIG. 18 in solid lines are in the process of being tightly drawn together by vacuum impressed through the passageways 147 and 147' of the forks 51 as viewed. The central film portions have been drawn into intimate engagement with the outer surfaces of the product 47 and the peripherally continuous seal is in the process of being formed. Upon continued vacuumizing of the die cavity, the peripheral film portions are fully contacted to a substantial extent about the product 47 and the continuous side seal formed thereby is illustrated in its entirety by the broken lines 160.

With continued stretching of the film within the die cavity during package and side seal formation, there is a possibility that adequate vacuumization of the die cavity would be obstructed in the event that a film portion covered the passageways 147 and 147'. To alleviate any possibility of incomplete seal formation, the slot or groove 146 formed in each inner peripheral surface of each fork 51 provides a continuous passageway by which air is continuously removed from the die cavity for seal formation completion. The provision of the communicating slots 146 prevents inadvertent blocking of the passageways 147 and 147' and assures adequate seal formation. In this connection, it will be noted in FIG. 12 that the end gaskets 149 carried by the arms 95 of each fork 51 are of such a width as to prevent blocking of the ends of the slots 146 associated therewith to thus provide complete peripheral communication of the slots of each fork 51 brought into paired relation for die formation.

Although not illustrated in FIGS. 17 and 18, the front and rear ends of each package forming die relative to the direction of movement of the same have received therein the top and bottom films, the die enclosed portions of which are drawn downwardly and stretched similarly as the side margins of the films to form front and rear side seals of the same type as formed along the side margins of the package and which are continuous with the radially outwardly directed side seal portions. As previously described, the type of seal formed with each package will depend upon the extent to which crystallization of the films has been retarded by supercooling. As fully disclosed in our aforementioned copending application, supercooling of the polyvinylidene chloride film can be carried out to an extent that a completely fused seal is formed upon contacting marginal portions of the film, which seal requires film destruction in order to gain access into the package. Controlled supercooling can be followed to an extent that a readily peelable or separable seal can be formed, which seal is capable of establishing and maintaining hermetic conditions while also being readily broken without the necessity of destroying, distorting or otherwise tearing or damaging the film portions defining the seal. The particular type of seal desired will not affect the packaging operating described as the seal defining properties are established in the films during supercooling of the same.

FIGS. 19–21 illustrate one form of package constituting a part of the invention wherein top and bottom films are used and during package formation are brought into intimate, tight, contour-conforming engagement with a plurality of products in side-by-side relation. The package 65 in the form illustrated is a wiener or sausage link product package including the plurality of separate products 47, previously described, arranged in side-by-side relation. A continuous side seal is formed along all sides of the aligned products, these products having been previously banded together in the known manner by use of a paper band 162. The continuous seal 160 extends radially outwardly of the side of the package 65 and is located substantially along the mid-points of the side margins thereof.

FIG. 21 illustrates the package 65 in cross section and it will be particularly noted that the top and bottom film portions 163 and 164, respectively, intimately contact the products enclosed thereby. The film portions are actually drawn downwardly intermediate the products 47 and this feature, among other things, provides a strong package 65 which is capable of readily withstanding conventional storage and merchandising handling practices. While the package 65 illustrated and described encloses a plurality of products placed in side-by-side relation, it will be understood that the packaging apparatus and method of the present invention is readily adapted for use in packaging a single product. The particular packaging procedure described in connection with the formation of the plural product package 65 is particularly useful in forming such a package as the tight conforming nature of the packaging film imparts rigidity to the unconnected products and eliminates the necessity of using stiffeners, such as cardboard backing, to supply a package of requisite strength for handling. Thus, it will be appreciated that the package forming apparatus and method of the present invention is particularly adapted, although not limited, in functioning to provide an improved form of plural product package of the type disclosed. Needless to say, the plural products enclosed in each package may take many different shapes providing such shapes do not interfere with the formation of a strong durable package of the type disclosed.

The package forming apparatus of the present invention includes an unique package holding and separating unit which has generally been referred to above. FIG. 22 illustrates the general structural arrangement of this unit which includes the chain mounted and driven series of top die elements 59 cooperating with the chain mounted and driven series of bottom die elements 62 for clamping each formed package within each joined pair of forks 51 to allow fork removal from between the joined films without sidewise displacement of the packages from the centrally located continuous path of movement thereof and distortion or other damage to the films. The combined die elements furthermore cooperate to separate each package from the continuous joined films with the result that the separated packages are automatically delivered onto conveyor 66 at the end of the apparatus as described in connection with FIGS. 1B and 2.

Referring particularly to FIGS. 23 and 24, each top die element 59 is formed from a rectangular frame 166 which is of adequate size to completely surround each package including the side seal portion 160 thereof. Opposite side margins of the frame 166 are provided with mounting ear portions 167 from which oppositely directed mounting studs 168 extend centrally thereof. The ear portions 167 each carry an inwardly directed cam follower 169, these cam followers being diametrically positioned to stabilize and control movement of the die element in a manner to be described. Extending longitudinally of the inner side of the frame 166 is a fixed plate 170 having received therethrough spring loaded pins 171. As particularly shown in FIG. 28, the outer ends of the pins 171 are provided with enlarged head portions 172 for camming purposes and the innermost ends are fixedly attached to a reciprocal blade mounting frame 173. The frame 173 is formed from transverse plates 174 mounted near each end of the frame 166 and interconnected by longitudinal strips 175. As particularly shown in FIG. 28, the peripheral edges of the frame 173 have attached thereto depending knife blades 176, these blades extending continuously about the entire periphery of the frame 173. A coil spring 177 is received about each pin 171 and is compressed between the outer surface of the plate 170 and the inner surface of the enlarged head 172 to urge the frame 173 inwardly toward the inner surface of the plate 170. In this respect the knife blades 176 are retracted within the frame 166 while being readily movable in a downwardly direction upon camming down of the pins 171. The frame 166 is provided with oppositely positioned hand grasping projections 178 for mounting and dismounting of the top die elements 59 without danger of contact with the knife blades 176.

Each of the bottom die elements 62 include a rectangular frame 180 as particularly shown in FIGS. 22 and 26. The frame 180 is of the same dimensions as the frame 166 of each of the top die elements 59 for abutment therewith as shown in FIGS. 27 and 28 in surrounding relation with a package 65. The top surface of the frame 180 is provided with a continuous groove 181 which is arranged to receive therein the knife blades 176 carried by a top die element 59. The frame 180 may further be provided with any suitable package supporting surface, the form illustrated including the use of a plurality of spaced rods 183 which receive therebetween the wieners 47 as illustrated in FIG. 27. The frame 180 is further provided with oppositely positioned, outwardly directed mounting studs 184 for connection to driving chains and, although not illustrated in detail, the inner surface of the frame 180 may be provided with diametrically positioned, inwardly directed cam followers of the type described in connection with the top die elements 59.

FIG. 22 illustrates the continuously moving top die element assembly wherein the top die elements 59 are mounted to spaced parallel chains 186 driven by sprockets 60 and 61 (see FIG. 1B) mounted on a driven shaft 187. The top die elements 59 are mounted to the chains by their mounting studs 168 and the cam followers 169 thereof are in engagement with spaced cam tracks 188. In this manner the series of top die elements 59 move continuously into package enclosing relation and near the end of the package enclosing travel a cam plate 189 engages the tops of the spring loaded pins 171 to move the frame 173 downwardly and force the knife blades 176 through the combined films surrounding the package. The particular travel of the top die elements 59 is shown in FIG. 25 wherein the cam followers 169 thereof are illustrated in engagement with a cam plate 188, this plate being of solid material as illustrated with the outer edge thereof being rounded to define the path of movement of the series of top die elements.

Each of the bottom die elements 62 are similarly mounted between paired driven chains 190 driven by the sprockets 63 and 64 of FIG. 1B through a shaft 191. The mounting studs 184 of the bottom die elements 62 are attached to the chains 190 for pivotal movement relative thereto and cam followers 192 are in engagement with spaced cam tracks 193 to stabilize and control the continuous movement of the bottom die elements.

With initial clamping of each package 65 by cooperating die elements 59 and 62, the paired forks 51 surrounding the package are still received between the combined films as previously described and are in supporting relation to the package. Referring particularly to FIGS. 27 and 28, the continuous marginal portions 67 of the combined films surrounding the package 65 is substantial for package forming purposes as previously described. Upon combining of the die elements 59 and 62, the marginal film is clamped between opposed surfaces of the frames 166 and 180. Complete tight clamping of the marginal film is thus attained and the combined forks 51 are slowly withdrawn out of engagement with the film. The right hand portion of FIG. 2 illustrates the withdrawal of the paired forks 51 from association with the film and during this withdrawal operation the film and spaced packages are tightly clamped against sidewise displacement or other distortional damage by the combined die elements. Upon adequate withdrawal of the paired forks from surrounding relation with each package 65 and continued clamping by the combined die elements, the path of movement of the combined die elements reaches the point of location of the camming plate 189 whereupon the leading pin 171 comes into engagement with an inclined camming surface 195 and is depressed to force the frame 173 with the knife blades 176 carried thereby in a downwardly direction. Once both of the spaced pins 171 are depressed by the camming plate 189, the knife blades 176 have penetrated the film 67 surrounding the package 65 and completely separated the latter from the continuous film. The knife blades are received within the continuous peripheral groove 181 of the frame 180 with the opposing surfaces of the frames 166 and 180 still retaining the marginal film 67 in tightly clamped relation. Upon separation of the package 65 from the marginal film 67, the package is completely supported by the rods 183 carried by the bottom die element 59.

Upon separation of the die elements as shown in FIG. 22, the separate package 65 continues with the bottom die element 59 and is ultimately dropped onto the conveyor 66 illustrated in FIGS. 1B and 2. The unbroken marginal film 67 is collected on a spindle 68 as previously described in connection with FIG. 1B. With the provision of two separate camming pins 171 for knife blade operation, the leading pin upon contact with the cam plate 189 causes the knife blade structure to rock and thus allow for localized penetration of the marginal film to facilitate complete cutting of the same surrounding each package. Upon movement of each top die element 59 past the cam plate 189, the knife blades 176 return to their original position withdrawn within the frame 166 by action of the coil springs 177.

While package formation and separation in conformance with the principles of the present invention has been described in connection with the package of wieners or sausage links, it will be understood that many different types of products can be readily packaged by following the procedure described where it is desired to enclose the products in a package in side-by-side relation. In this respect strips of shortening of predetermined quantity measurement can be readily packaged. Similarly, pats or sticks of butter, cheese strips or cubes, candy sticks, and gum are further examples of different types of products readily adapted for use in packaging in the manner described. The principles of the present invention are not limited solely to packaging food products, although due to the hermetic sealing conditions readily established during packaging, the present method is particularly adapted for food product packaging. However, any products or articles may be received within the dies for package formation and in this respect cigars and drill bits are further examples of different types of articles readily adapted for packaging. Furthermore, while the apparatus described is particularly designed for use with supercooled polyvinylidene chloride film, it will be understood that such apparatus is also capable of use with heat sealed film such as roll stock which is heated by suitable means upon introduction into association with the package forming die plates.

Obviously, many modifications and variations of the invention as hereinbefore set forth may be made without departing from the spirit and scope thereof, and therefore only such limitations should be imposed as are indicated in the appended claims.

We claim:

1. Package holding and removal apparatus for use in separating a plurality of spaced packages from a continuous film of packaging material such as polyvinylidene chloride, said apparatus including oppositely positioned upper and lower package clamping members of frame-like shape connected to means for at least vertically moving said members into and out of successive package surrounding and film clamping position, the lower of said clamping members having means receiving and engaging a package in unattached vertical support thereof, one of said members carrying reciprocal knife means, the opposite opposed faces of peripheral portions of said members being aligned for film clamping in package surrounding relation upon receipt of a package on said support means, and actuation means forming a part of said members in operative association with said knife means.

2. Package holding and removal apparatus for use in separating a plurality of spaced packages from a continuous film of packaging material such as polyvinylidene chloride, said apparatus including oppositely positioned package clamping members of frame-like shape connected to means for moving said members into and out of package surrounding and clamping position, one of said members having means by which a package is supported and the other of said members carrying reciprocal knife means, the opposite faces of peripheral portions of said members being aligned for film clamping in package surrounding relation, and actuation means forming a part of said members in operative association with said knife means, one of said opposite faces being provided with a continuous groove over which said film is clamped, said knife means being aligned with said groove for movement through said film into and out of said groove.

References Cited by the Examiner
UNITED STATES PATENTS
2,257,965   10/1941   Koch _____ 83—456 X WILLIAM S. LAWSON, *Primary Examiner.*